US012739221B2

(12) United States Patent
Kim et al.

(10) Patent No.: US 12,739,221 B2
(45) Date of Patent: Sep. 15, 2026

(54) MESSAGE NOTIFICATION METHOD OF ONLINE MESSENGER, AND COMPUTING DEVICE USING SAME

(71) Applicant: SAMSUNG SDS CO., LTD., Seoul (KR)

(72) Inventors: Vera Kim, Seoul (KR); Minchul Lee, Seoul (KR); Jane Lee, Seoul (KR); Jeno Chang, Seoul (KR); Andy Jeong, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 0 days.

(21) Appl. No.: 18/677,198

(22) Filed: May 29, 2024

(65) Prior Publication Data

US 2024/0430224 A1 Dec. 26, 2024

(30) Foreign Application Priority Data

May 31, 2023 (KR) ........................ 10-2023-0070163

(51) Int. Cl.
*H04L 51/224* (2022.01)
*H04L 51/043* (2022.01)
*H04L 51/216* (2022.01)

(52) U.S. Cl.
CPC .......... *H04L 51/224* (2022.05); *H04L 51/043* (2013.01); *H04L 51/216* (2022.05)

(58) Field of Classification Search
CPC ... H04L 51/224; H04L 51/043; H04L 51/216; H04L 51/04; H04L 51/214; H04L 51/226; H04L 51/212; G06F 40/279; G06Q 50/50
See application file for complete search history.

(56) References Cited

U.S. PATENT DOCUMENTS 8,566,413 B2 10/2013 Horvitz
2004/0194110 A1* 9/2004 McKee .................. G06Q 10/10 719/310
2007/0271504 A1* 11/2007 Horvitz ................ G06Q 10/107 715/236
2010/0077054 A1* 3/2010 Harada ............. H04M 1/72436 709/207

(Continued)

FOREIGN PATENT DOCUMENTS

KR 10-2015-0054166 A 5/2015
WO WO 2018/040440 A1 3/2018

OTHER PUBLICATIONS

Extended European Search Report issued Oct. 16, 2024 in counterpart European Patent Application No. 24178744.9. (5 pages in English).

*Primary Examiner* — Azizul Choudhury
(74) *Attorney, Agent, or Firm* — NSIP Law

(57) ABSTRACT

The present disclosure relates to a message notification method of an online messenger, and a computing device using the same. The message notification method of the online messenger according to an embodiment of the present disclosure includes determining, when a new message is received, the importance of the new message based on keywords included in the new message; identifying a user status configured within the online messenger; and controlling a notification display indicating reception of the new message based on the importance of the new message and the user status.

14 Claims, 24 Drawing Sheets

(56) References Cited

U.S. PATENT DOCUMENTS

| | | | | |
|---|---|---|---|---|
| 2012/0297322 | A1* | 11/2012 | Malik | G06Q 10/107<br>715/758 |
| 2014/0089848 | A1 | 3/2014 | Smith et al. | |
| 2014/0207880 | A1* | 7/2014 | Malkin | H04L 51/224<br>709/206 |
| 2015/0134753 | A1 | 5/2015 | Shin | |
| 2019/0182196 | A1* | 6/2019 | Avital | H04L 51/42 |
| 2020/0336443 | A1* | 10/2020 | Pottier | H04L 51/234 |

* cited by examiner

M
MESSENGER SERVER
100
NOTIFICATION CONTROL SERVER
NETWORK
1
1
1

D1
RECEPTION MESSAGE DB
M
MESSENGER SERVER
RECEIVED MESSAGE
100
110
MESSAGE GROUP GENERATION UNIT
120
MESSAGE IMPORTANCE DETERMINATION UNIT
130
NOTIFICATION DISPLAY DETERMINATION UNIT
140
UPDATE UNIT
D2
OUTPUT NOTIFICATION DISPLAY
1
USER TERMINAL

Fig. 3A

| MESSAGE GROUP | REFERENCE SCORE |
| --- | --- |
| FIRST MESSAGE GROUP | 0.8 |
| SECOND MESSAGE GROUP | 0.7 |
| THIRD MESSAGE GROUP | 0.6 |
| FOURTH MESSAGE GROUP | 0.5 |
| | |

| USER STATUS | TIFICATION REFERENCE VALUE |
| --- | --- |
| VACATION | 0.8 |
| MEETING | 0.7 |
| DAY OFF | 0.6 |
| LATE NIGHT | 0.5 |
| | |

<FIRST MESSAGE GROUP>

| KEYWORD | FREQUENCY |
| --- | --- |
| @LEE MIN-CHEOL | 25 |
| JIRA | 21 |
| BUG | 17 |
| PR | 16 |
| | |

<SECOND MESSAGE GROUP>

| KEYWORD | FREQUENCY |
| --- | --- |
| TEAMS | 27 |
| JIRA | 22 |
| MEETING | 15 |
| REVIEW | 13 |
| | |

<THIRD MESSAGE GROUP>

| KEYWORD | FREQUENCY |
|---|---|
| PR | 21 |
| MODIFICATION | 21 |
| DEV | 19 |
| EDUCATION | 14 |
| | |

Figure 6C:
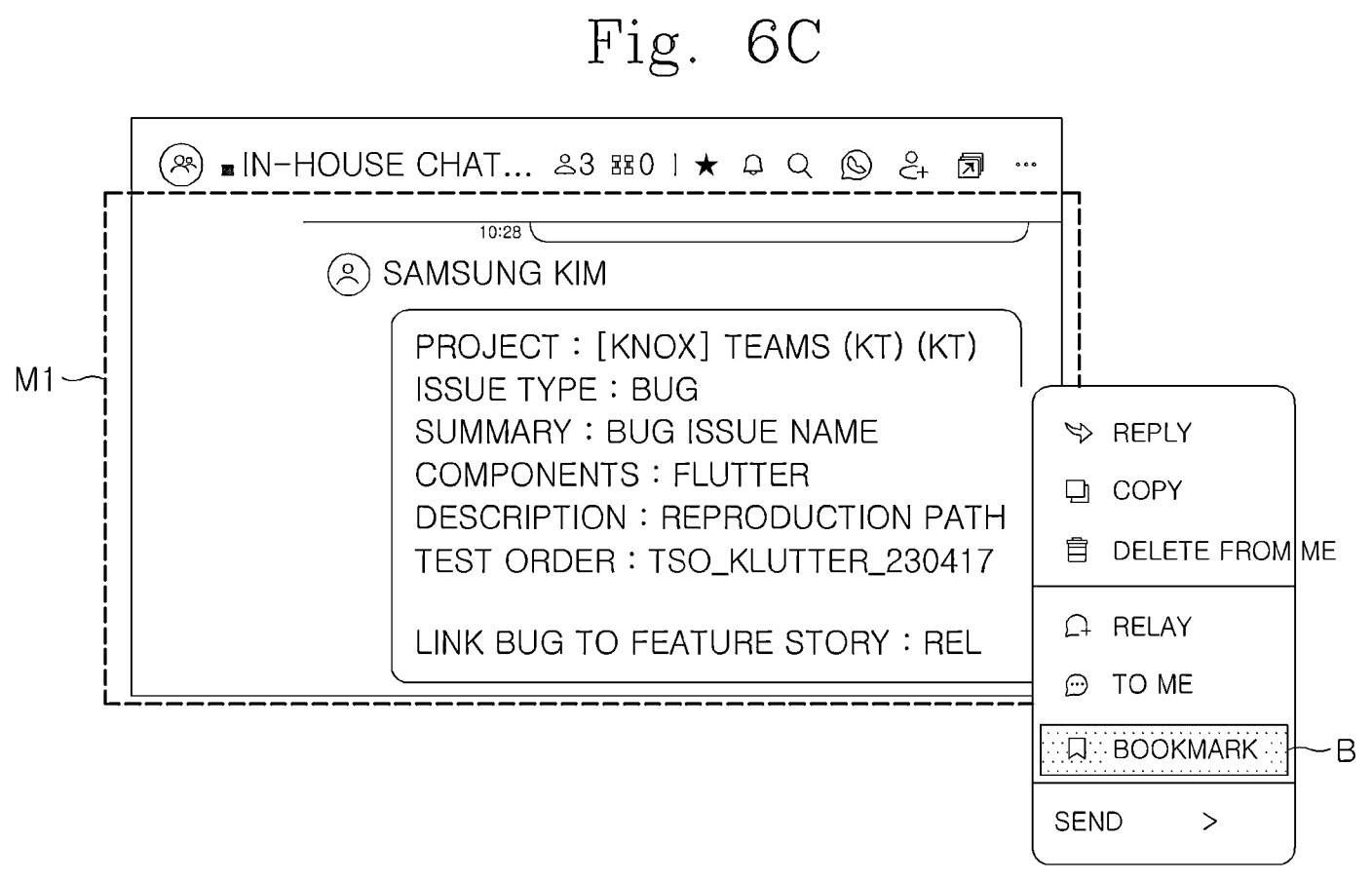

IN-HOUSE CHAT... 3 0
10:28
SAMSUNG KIM
PROJECT : [KNOX] TEAMS (KT) (KT)
ISSUE TYPE : BUG
SUMMARY : BUG ISSUE NAME
COMPONENTS : FLUTTER
DESCRIPTION : REPRODUCTION PATH
TEST ORDER : TSO_KLUTTER_230417
LINK BUG TO FEATURE STORY : REL
REPLY
COPY
DELETE FROM ME
RELAY
TO ME
BOOKMARK
SEND >
B
M1

Figure 7B:
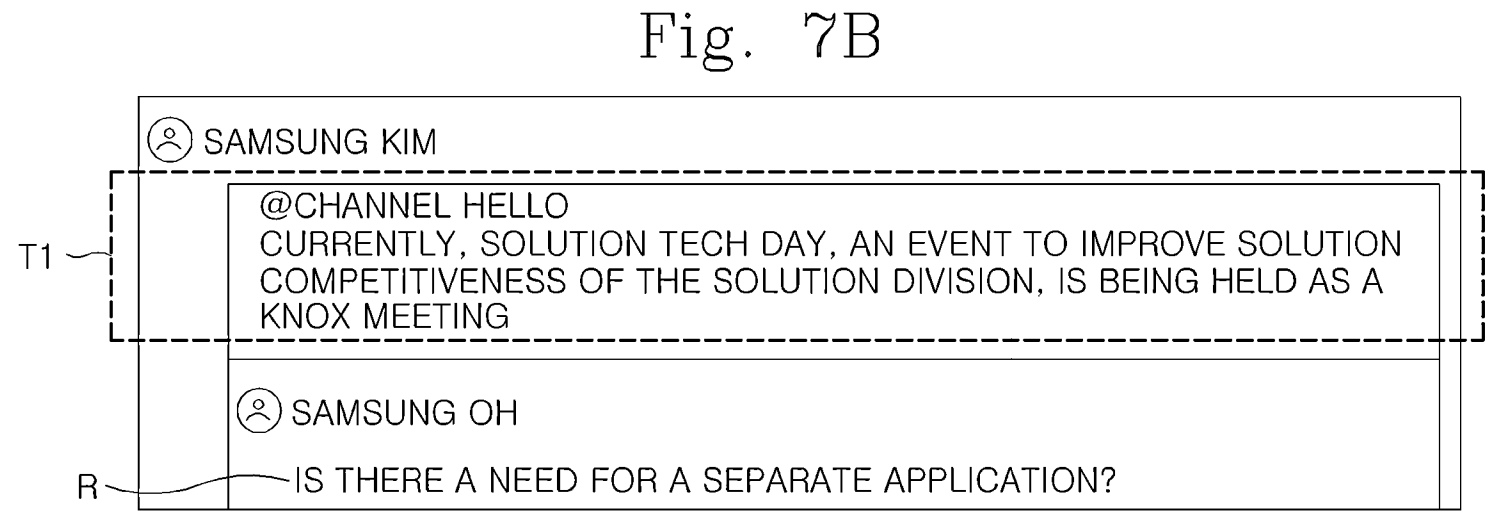

SAMSUNG KIM

@CHANNEL HELLO
CURRENTLY, SOLUTION TECH DAY, AN EVENT TO IMPROVE SOLUTION COMPETITIVENESS OF THE SOLUTION DIVISION, IS BEING HELD AS A KNOX MEETING

SAMSUNG OH

IS THERE A NEED FOR A SEPARATE APPLICATION?

| | FIRST MESSAGE GROUP | SECOND MESSAGE GROUP | THIRD MESSAGE GROUP |
|---|---|---|---|
| REFERENCE SCORE | 0.8 | 0.7 | 0.6 |
| SECOND SIMILARITY | 0.6 | 0.7 | 0.8 |

Fig. 9B

| | FIRST MESSAGE GROUP | SECOND MESSAGE GROUP | THIRD MESSAGE GROUP |
|---|---|---|---|
| REFERENCE SCORE | 0.8 | 0.7 | 0.6 |
| SECOND SIMILARITY | 0.7 | 0.6 | 0.5 |

Fig. 11

| MESSAGE GROUP | REFERENCE SCORE/NOTIFICATION/ NOTIFICATION REFERENCE VALUE | USER STATUS |
|---|---|---|
| FIRST MESSAGE GROUP | 0.8 | VACATION |
| SECOND MESSAGE GROUP | 0.7 | MEETING |
| THIRD MESSAGE GROUP | 0.6 | DAY OFF |
| FOURTH MESSAGE GROUP | 0.5 | LATE NIGHT |

Fig. 12A
6:43
95%
OCTOBER 29 (TUESDAY)
MEDIA
DEVICE
SAMSUNG KIM PM 3:17
[IMPORTANT] 2 NEW MESSAGES

Fig. 13A
6:43
95%
OCTOBER 29 (TUESDAY)
MEDIA
DEVICE
SAMSUNG KIM PM 3:17
[IMPORTANT] 2 NEW MESSAGES

MESSAGE NOTIFICATION METHOD OF ONLINE MESSENGER, AND COMPUTING DEVICE USING SAME

CROSS-REFERENCE TO RELATED APPLICATION(S)

This application is based on and claims priority under 35 U.S.C. 119 to Korean Patent Application No. 10-2023-0070163, filed on May 31, 2023, in the Korean Intellectual Property Office, the disclosure of which is herein incorporated by reference in its entirety.

BACKGROUND OF THE INVENTION

1. Field of the invention

The present disclosure relates to a message notification method of an online messenger that can output a notification display in consideration of the importance of the message and a user's status when receiving a message through the online messenger, and to a computing device using the same.

2. Description of the Prior Art

Instant Messenger is widely used as a useful method for real-time delivery of information using the Internet. Instant messenger is for real-time delivery of simple messages between users, allowing the users to talk as if they were talking directly through text messages delivered in real-time. In addition, as messenger services have expanded from existing PC-based messenger services to IP-based mobile messengers, the messengers are widely used not only for promoting personal socialization but also for business communication.

However, as the use of messengers becomes more important for work performance and intercommunication, users are indiscriminately exposed to message reception notifications even when they are unable to participate in conversations or receive messages with content unrelated to work. For example, in cases where a user continuously receives message notifications while on vacation or in a meeting, the notifications may make it difficult for the user to concentrate on the vacation or the meeting, which may cause problems such as increasing user fatigue.

In addition, users can control notifications for incoming messages by directly disabling notifications for each individual chat room or disabling notifications for the entire messenger. However, in this case, there is a risk that problems such as disruption to work may occur due to missing messages that require user confirmation.

SUMMARY OF THE INVENTION

The present disclosure has been made in order to solve the above-mentioned problems in the prior art and an aspect of the present disclosure is to provide a message notification method of an online messenger that can control the output of a notification display for a received message in consideration of the importance of the message and a user's status, and a computing device using the same.

Another aspect of the present disclosure is to provide a message notification method of an online messenger that can extract messages with a user interaction as important messages and determine the importance of received messages based on keywords extracted from the important messages, and a computing device using the same.

Still another aspect of the present disclosure is to provide a message notification method of an online messenger that can determine and classify the importance of received messages in a customized manner for each user and provide a notification for each message differentially according to a user's status, and computing device using the same.

In accordance with an aspect of the present disclosure, there is provided a message notification method of an online messenger which is performed in a computing device, the message notification method including determining, when a new message is received, the importance of the new message based on keywords included in the new message; identifying a user status configured within the online messenger; and controlling a notification display indicating reception of the new message based on the importance of the new message and the user status.

Here, the notification display may indicate the reception of the new message by using at least one of vibration, sound, and a visual display upon the reception of the new message.

Here, the visual display may display at least one of a pop-up window, a top bar display object, and a display object that distinguishes and displays a chat room to which the new message is transmitted from a chat room list in the online messenger on a display device of a user terminal.

Here, the determining of the importance of the new message may include determining a message group including the new message among a plurality of message groups classified according to the importance of the message.

Here, the controlling of the notification display may include comparing a reference score of the message group with a notification reference value corresponding to the user status, outputting the notification display when the reference score is equal to or higher than the notification reference value, and omitting the output of the notification display when the reference score is less than the notification reference value.

Here, the message notification method for the online messenger according to an embodiment of the present disclosure may further include generating the plurality of message groups based on a user interaction for messages received in the past.

Here, the generating of the message groups may include collecting messages received through the online messenger for a predetermined period; extracting the message with the user interaction as the important message among the collected messages; extracting keywords from the important message and configuring the important messages as a reference group; comparing the keywords of the collected messages with keywords of the reference group to obtain a first similarity of each of the messages; and configuring a reference score for each of the plurality of message groups, comparing the first similarity with the reference score, and classifying the collected messages into one of the plurality of message groups.

Here, the plurality of message groups may further include and store keywords extracted from messages included in each message group and frequencies of the keywords.

Here, the determining of the importance of the new message may further include comparing the keywords included in each message group and the keywords included in the new message to obtain a second similarity for each message group; comparing the second similarity for each message group with the reference score configured for each message group; and determining, when there is a case where the second similarity for each message group is equal to or higher than the reference score configured for each message group, the message group with the highest second similarity among the second similarities that are equal to or higher than the reference score as the message group including the new message.

Here, the determining of the importance of the new message may further include comparing, when there is no case where the second similarity for each message group is equal to or higher than the reference score configured for each message group, the second similarity with a first message group that has the highest reference score among the message groups with the reference score for each message group; and determining, when there is the message group whose second similarity with the first message group is equal to or higher than the reference score, the message group as the message group including the new message.

Here, the message notification method for the online messenger according to an embodiment of the present disclosure may further include modifying a frequency of keywords within the message group including the new message by using keywords of the new message.

Here, the message notification method for the online messenger according to an embodiment of the present disclosure may further include periodically or aperiodically updating the plurality of message groups based on the message received by the online messenger.

Here, the updating may include extracting, when there is a user interaction for the received message, the message as the important message; extracting keywords from the important message, and confirming whether the important message is included in the remaining message groups other than the first message group having the highest reference score among the message groups; decreasing the frequency of keywords corresponding to the important message within the remaining message groups and increasing the frequency of the keywords corresponding to the important message within the first message group, when the important message is included in the remaining message groups; and increasing the frequency of the keywords corresponding to the important message within the first message group when the important message is not included in the remaining message groups.

In order to perform the message notification method of the online messenger described in combination with hardware according to an embodiment of the present disclosure, a computer program stored in a medium can be implemented.

In accordance with another aspect of the present disclosure, there is provided a computing device which includes a processor and performs message notification of an online messenger, wherein the processor includes operations of: determining, when a new message is received, the importance of the new message based on keywords included in the new message; identifying a user status configured within the online messenger; and controlling a notification display indicating reception of the new message based on the importance of the new message and the user status.

Here, the determining of the importance of the new message may include determining a message group including the new message among a plurality of message groups classified according to the importance of the message.

Here, the controlling of the notification display may include comparing a reference score of the message group with a notification reference value corresponding to the user status, outputting the notification display when the reference score is equal to or higher than the notification reference value, and omitting the output of the notification display when the reference score is less than the notification reference value.

Here, the processor of the computing device according to an embodiment of the present disclosure may further include an operation of generating the plurality of message groups based on a user interaction for messages received in the past.

Here, the generating of the message groups may include collecting messages received through the online messenger for a predetermined period; extracting the message with the user interaction as the important message among the collected messages; extracting keywords from the important message and configuring the important messages as a reference group; comparing the keywords of the collected messages with keywords of the reference group to obtain a first similarity of each of the messages; and configuring a reference score for each of the plurality of message groups, comparing the first similarity with the reference score, and classifying the collected messages into one of the plurality of message groups.

Here, the determining of the importance of the new message may further include comparing the keywords included in each message group and the keywords included in the new message to obtain a second similarity for each message group; comparing the second similarity for each message group with the reference score configured for each message group; and determining, when there is a case where the second similarity for each message group is equal to or higher than the reference score configured for each message group, the message group with the highest second similarity among the second similarities that are equal to or higher than the reference score as the message group including the new message.

Additionally, Technical Solutions described above do not enumerate all the features of the present disclosure. The various features of the present disclosure and the resulting advantages and effects can be understood in more detail by referring to the specific embodiments below.

According to a message notification method of an online messenger and a computing device using the same according to an embodiment of the present disclosure, it is possible to determine the output of a notification display for received messages by simultaneously considering the importance of the received messages and a user status. Accordingly, when the user is in a meeting or on vacation, the user may not be notified of unnecessary messages and can focus on the meeting or vacation. In addition, even when the user is in a meeting or on vacation, reception notifications may be displayed for important messages, preventing the user from missing or not checking important messages.

In addition, according to a message notification method of an online messenger and a computing device using the same according to an embodiment of the present disclosure, messages to which the user actively responded may be extracted as important messages, and the importance of the received messages may be determined based on keywords extracted from the important messages. Therefore, it is possible to determine and classify the importance of received messages in a customized manner for each user.

However, the effects that can be achieved by the message notification method of the online messenger and the computing device using the same according to the embodiments of the present disclosure are not limited to those mentioned above, and other effects not mentioned will be clearly understood by those skilled in the art from the description below.

BRIEF DESCRIPTION OF THE DRAWINGS

The above and other aspects, features, and advantages of the present disclosure will be more apparent from the following detailed description taken in conjunction with the accompanying drawings, in which:

FIG. 3A is an exemplary diagram illustrating a reference score for each message group;

FIG. 3B is an exemplary diagram illustrating a notification reference value for each user status;

FIG. 4A is an exemplary diagram illustrating keywords and frequencies for a first message group according to an embodiment of the present disclosure;

FIG. 4B is an exemplary diagram illustrating keywords and frequencies for a second message group according to an embodiment of the present disclosure;

FIG. 4C is an exemplary diagram illustrating keywords and frequencies for a third message group according to an embodiment of the present disclosure;

FIG. 6C is an exemplary diagram illustrating user interaction when setting an important message, where the user bookmarks the received message;

FIG. 7A is an exemplary diagram illustrating user interaction when setting an important message, where the message is sent by specifying a user;

FIG. 7B is an exemplary diagrams illustrating user interaction when setting an important message, where a user enters a comment in a channel thread provided by the messenger.

FIG. 9A is an exemplary diagram illustrating determining of a message group of a new message according to an embodiment of the present disclosure;

FIG. 9B is an exemplary diagram illustrating determining of a message group of a new message according to another embodiment of the present disclosure;

FIG. 11 is an exemplary diagram illustrating a reference score for each message group and a notification reference value for each user status according to an embodiment of the present disclosure;

FIG. 13B is an exemplary diagram illustrating a message notification display when a user enters a chat room list on an online messenger while the user status is set to "holiday";

FIG. 14B is an exemplary diagram illustrating a message notification display when a user enters a chat room list on an online messenger while the user status is set to "vacation";

FIG. 16 is a block diagram illustrating a computing device according to an embodiment of the present disclosure.

DETAILED DESCRIPTION OF THE EXEMPLARY EMBODIMENTS

Figure 1:
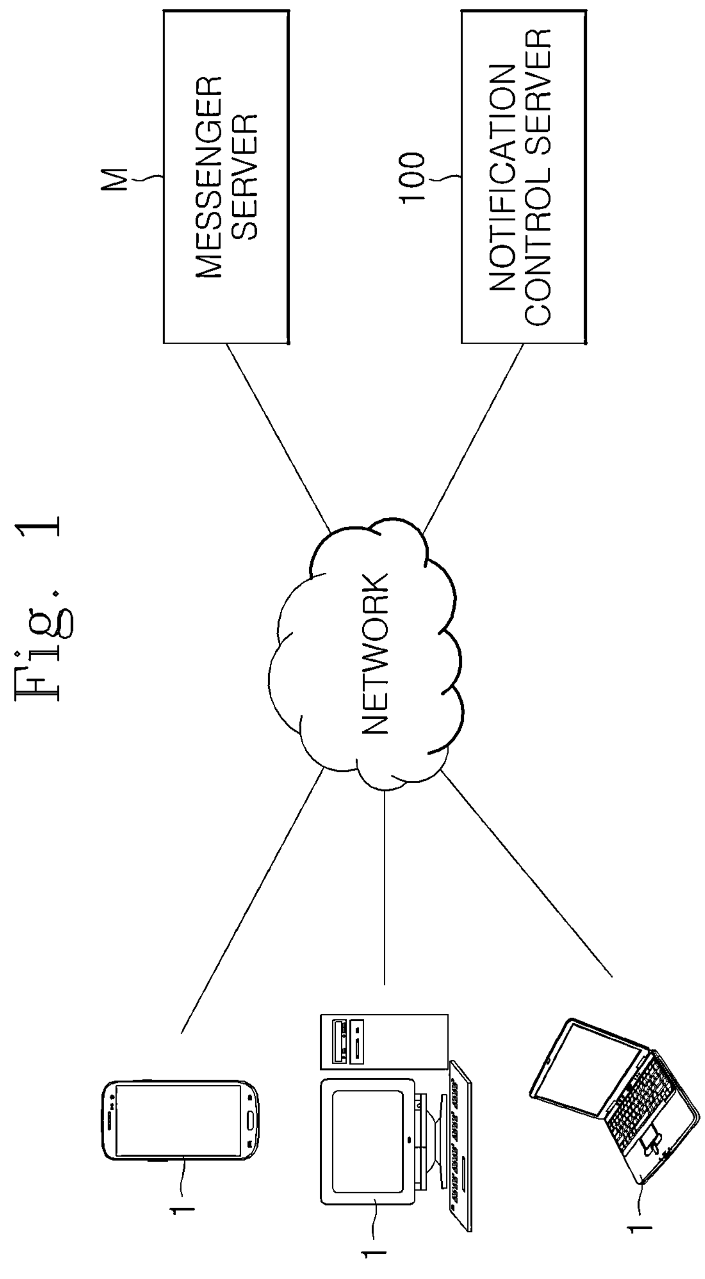
FIG. 1 is a schematic diagram illustrating an online messenger system according to an embodiment of the present disclosure.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted.

In the following description, with respect to constituent elements used in the following description, the suffixes "~module" and "~unit" are used or combined with each other only in consideration of ease in the preparation of the specification, and do not have or serve as different meanings. Accordingly, the suffixes "~module" and "~unit" may be interchanged with each other. In other words, the terms "unit" and "module" used herein means a hardware component such as software, FPGA, or ASIC and performs predetermined functions. However, the term "unit" and "module" is not limited to software or hardware. The "unit" or "module" may be configured to be stored in a storage medium that can be addressed or may be configured to regenerate one or more processors. Accordingly, for example, the "unit" or "module" includes components such as software components, object-oriented software components, class components, and task components, processors, functions, attributes, procedures, subroutines, segments of a program code, drivers, firmware, a microcode, a circuit, data, a database, data structures, tables, arrays, and variables. Functions provided in components, and the "units" or "modules" may be combined into fewer components, and "units" or "modules" or further separated into additional components, and "units" or "modules".

In addition, in the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

FIG. 1 is a schematic diagram illustrating an online messenger system according to an embodiment of the present disclosure.

Referring to FIG. 1, an online messenger system according to an embodiment of the present disclosure may include a user terminal 1, a messenger server M, and a notification control server 100.

Hereinafter, an online messenger system according to an embodiment of the present disclosure will be described with reference to FIG. 1.

The user terminal 1 may be installed with a messenger application to receive an online messenger service, and the user terminal 1 may access the messenger server M through the messenger application. Here, the user terminal 1 may be connected to the messenger server M through a wired or wireless network, and transmit and receive messages including various contents such as text, voice, images, videos, files, etc., to and from another user terminal 1 through the messenger server M and the messenger application. The user terminal 1 may be a smartphone, tablet PC, laptop, wearable device, desktop, etc. In addition, the user terminal 1 may include any device that can exchange information by connecting to the messenger server M through a wired or wireless network.

Here, the network may be configured regardless of the communication type, such as wired or wireless communication, and include various communication networks such as a personal area network (PAN), a local area network (LAN), a metropolitan area network (MAN), a wide area network (WAN), and the like. In addition, the network may be the well-known World Wide Web (WWW), and also use wireless transmission technology used for short-range communication, such as Infrared Data Association (IrDA) or Bluetooth.

The messenger server M may be a server that transmits and receives data necessary for executing a messenger application to and from the user terminal 1. Depending on the embodiment, the messenger server M may be a server operated by a provider that produces a messenger application and provides services based on the messenger application.

The messenger application may provide a service that allows the user terminals 1 installed with the messenger application to have real-time conversations over the Internet. The messenger server M may generate a chat room for conversation between users, and when the chat room is generated, messages transmitted from each user terminal 1 may be transmitted to another user terminal 1 through the chat room.

Here, the generated chat room may be maintained within the messenger application as long as there is no separate termination input. Accordingly, the user may enter a chat room by selecting one of a plurality of chat room lists generated and have a real-time conversation with users participating in the chat room. In addition, the messenger application may generate a group chat room in which multiple users participate in addition to a one-to-one chat room, and provide real-time conversation between multiple users through the group chat room. Depending on the embodiment, it is possible for a user to generate a channel thread and allow multiple users to participate, and the messenger application may be a business messenger application used by companies or public institutions.

Meanwhile, in the case of a messenger service provided by the messenger server M, notifications for received messages may be unilaterally displayed even in situations where the user cannot immediately check the message due to a meeting, vacation, or holiday. There is a function in the messenger that displays the user's status so that the other party can recognize the user's status, but this function only serves to display the user's status so that the other party can recognize the user's status. For example, when a user sets the user status to vacation or meeting, the other party is encouraged to confirm this and refrain from sending messages.

However, even though the user status is set to vacation or meeting, etc., when the other party sends a message, the message is received on the user terminal 1 along with a notification, so that the user cannot concentrate on vacation or meeting, etc., due to the notification. To avoid this, the user may perform operations such as logging out of the messenger or turning off all notifications, but in this case, cases such as missing important business messages may occur, which may interfere with work processing.

Here, the online messenger system according to an embodiment of the present disclosure may further include a notification control server 100, where the notification control server 100 may provide a function of determining the importance of messages received by the user, comparing the importance with the user status, and providing a notification of message reception only for messages with the high importance. Accordingly, it is possible to prevent the user from being disturbed by notifications of generally received messages and increase user convenience by outputting notifications for important messages.

The notification control server 100 may receive messages received by the user terminal 1 from the messenger server M, and through this, determine whether a notification for each message is displayed. Thereafter, the notification control server 100 may transmit a control message to the user terminal 1 and control whether to display a notification for the corresponding message. In FIG. 1, the notification control server 100 is shown as a configuration independent of the messenger server M and the user terminal 1, but depending on the embodiment, the notification control server 100 may be implemented to be included in the messenger server M or the messenger application installed on the user terminal 1. Hereinafter, the notification control server 200 according to an embodiment of the present disclosure will be described with reference to FIG. 2.

Figure 2:
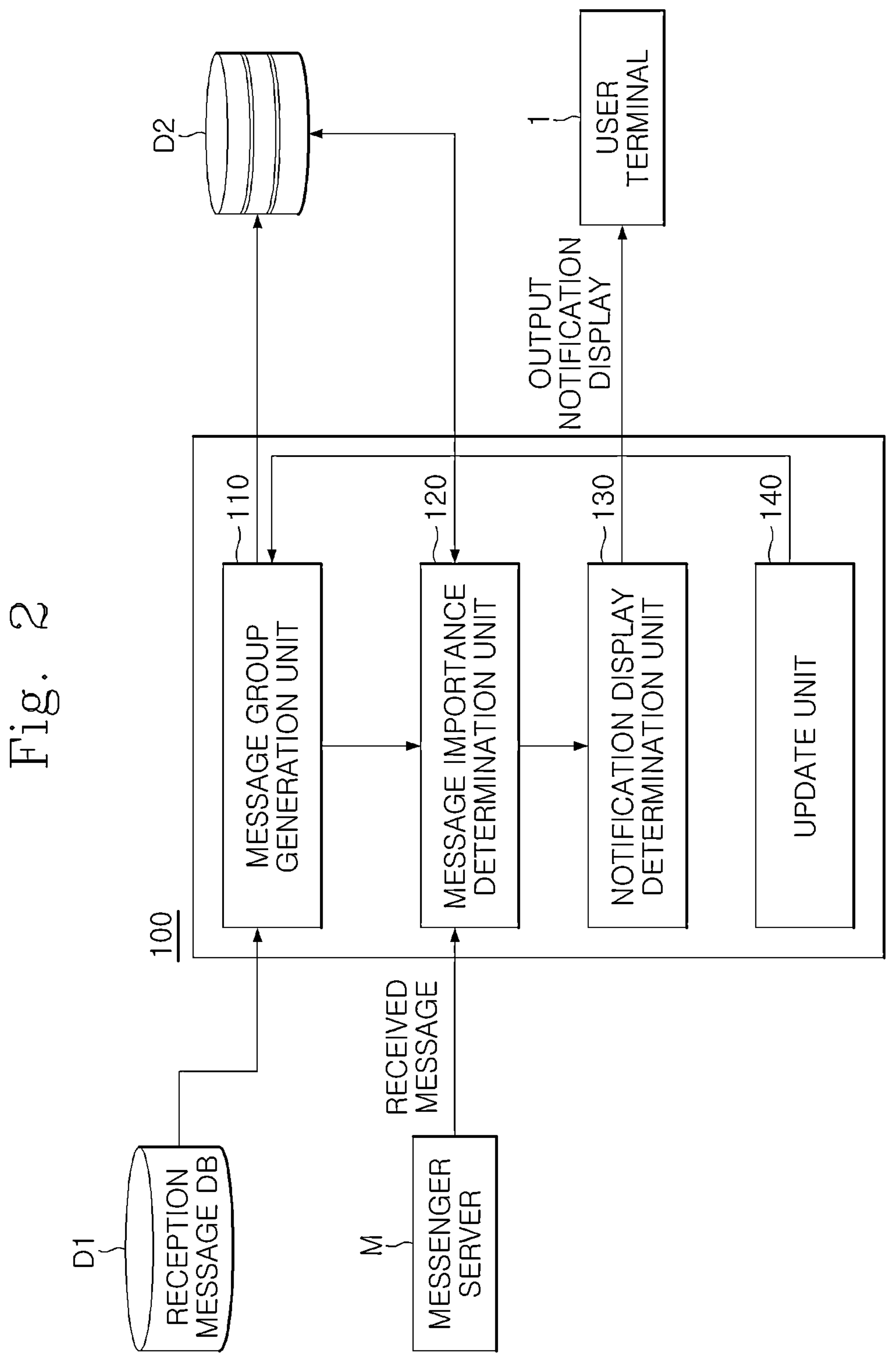
FIG. 2 is a block diagram illustrating a notification control server according to an embodiment of the present disclosure.

FIG. 2 is a block diagram illustrating the notification control server 100 according to an embodiment of the present disclosure.

Referring to FIG. 2, the notification control server 100 according to an embodiment of the present disclosure may include a message group generation unit 110, a message importance determination unit 120, a notification display determination unit 130, and an update unit 140.

The message group generation unit 110 may generate a plurality of message groups based on user interaction with messages received in the past. That is, the plurality of message groups may be defined in advance according to the importance of each message. At this time, the message groups may be generated for each user of the online messenger.

The message group generation unit 110 may collect messages from a reception message database DI, where messages received by each user are stored. In the reception message database D1, received messages and user interaction details for each message may also be stored.

Referring to FIG. 3A, the message groups may include a first message group, a second message group, a third message group, a fourth message group, etc., and for each message group, reference scores such as 0.8, 0.7, 0.6, and 0.5 may be set. Here, the reference score is set based on similarity to the important message, and may be set to a value between 0 and 1 depending on the embodiment. The reference score may be set higher as the similarity with the important messages increases. Here, the higher the reference score, the more important the message group is.

In addition, referring to FIG. 3B, each notification reference value may be set according to the user status such as vacation, meeting, holiday, late at night, etc. The higher the notification reference value, the more important message may be received. For example, when the user status is "meeting," a notification display may be provided only for messages included in the message groups (first message group and second message group) with the reference score of 0.7 or higher. Here, the user status may be obtained such that the user of the messenger selects his or her status on the messenger.

Here, the reference score, user status, notification reference value, etc., for each message group are shown as examples and can be used in various modifications depending on the embodiment.

Meanwhile, the plurality of message groups may be stored including keywords extracted from messages included in each message group and the frequency of each keyword. Here, the keyword corresponds to a set of words obtained by analyzing the morphemes of the messages included in the corresponding message group, and the frequency corresponds to the cumulative number of each keyword in the messages included in the corresponding message group. The plurality of generated message groups may be stored in a message group database D2.

Referring to FIG. 4, it can be seen that each message group includes different keywords and frequencies. Here, for example, when a message containing "bug" and "PR" is additionally stored in the first message group, the frequency of "bug" in the first message group in FIG. 4A is changed from 17 to 18, and the frequency of "PR" may be changed from 16 to 17.

Figure 5:
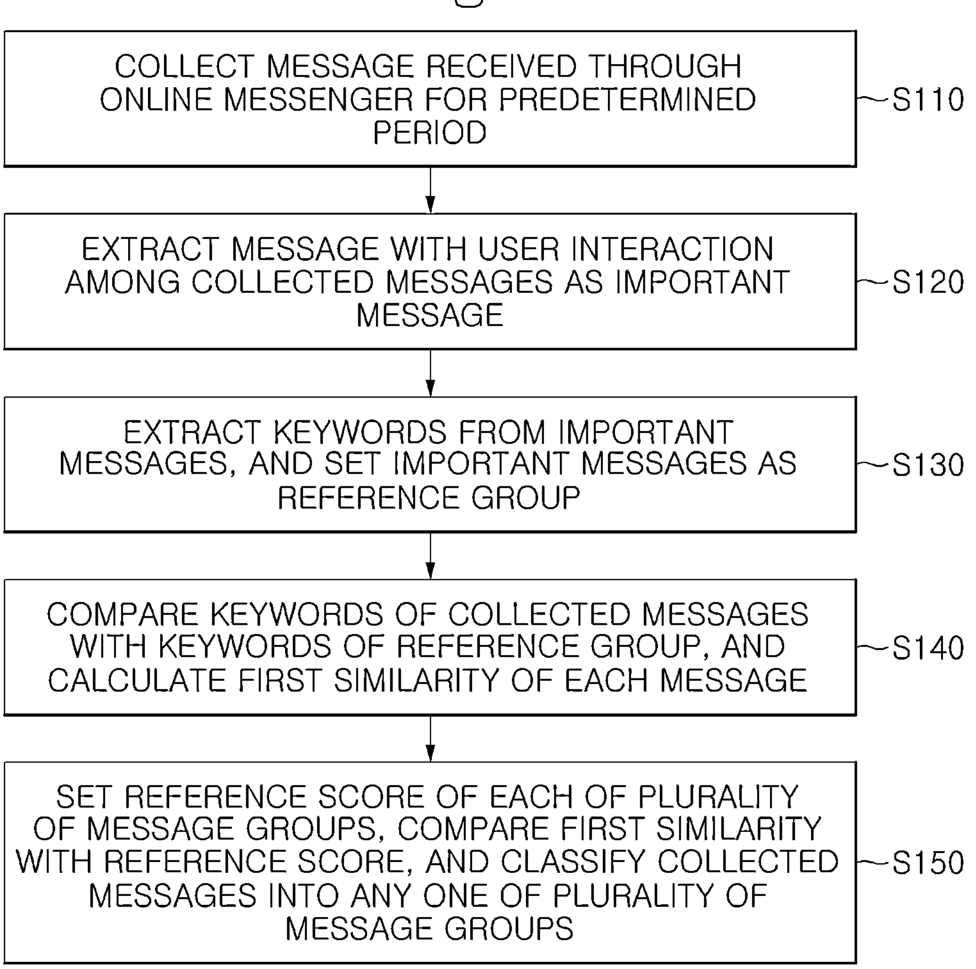
FIG. 5 is a flowchart illustrating generating of a message group according to an embodiment of the present disclosure.

Referring to FIG. 5, the message group generation unit 110 may first collect messages received in the past to generate a plurality of message groups. That is, the message group generation unit 110 may collect messages received through the online messenger for a predetermined period (e.g., the last 90 days) in operation S110.

Next, the message group generation unit 110 may extract messages with user interaction from among the collected messages as important messages in operation S120. In other words, the fact that the user actively responded to the received message can be seen as indicating that the user is interested in the message or that the message has a high importance. Accordingly, the message group generation unit 110 may separately extract the messages including the user interaction as the important messages from among the plurality of received messages.

Figure 6A:
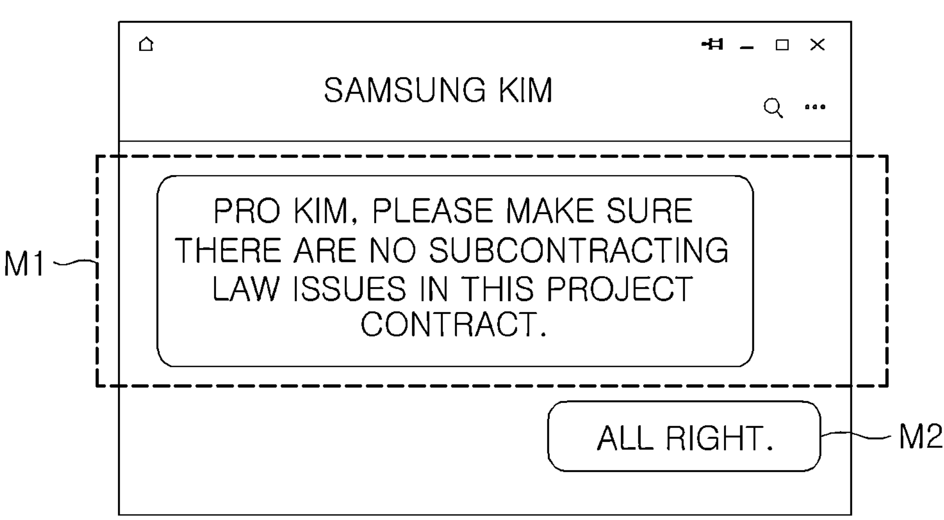
FIG. 6A is an exemplary diagram illustrating user interaction when setting an important message, where a user sends a reply to a message received in a one-to-one chat room.
Figure 6B:
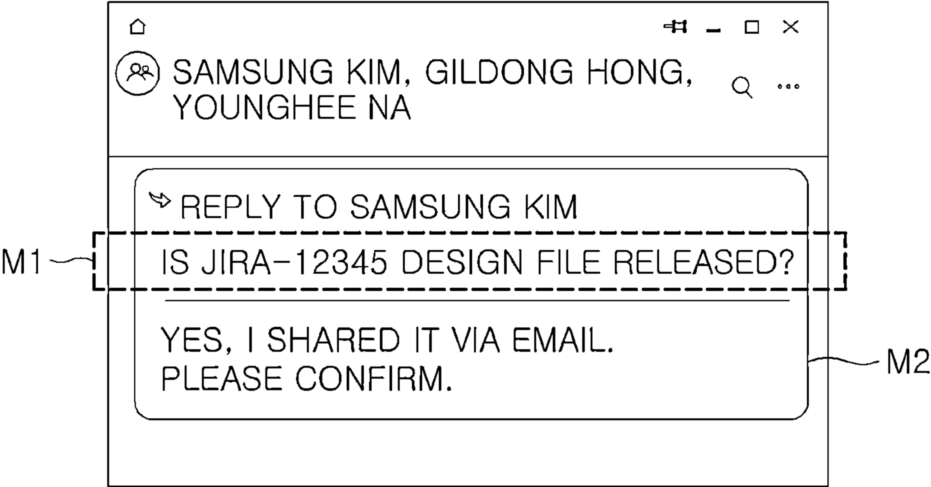
FIG. 6B is an exemplary diagram illustrating user interaction when setting an important message, where a user sends a reply to a message received in a group chat room.

Here, the user interaction for extracting important messages may be set in various ways depending on the embodiment. For example, as shown in FIG. 6A, when a user sends a reply message M2 to a message M1 received by the user in a one-to-one chat room, the received message M1 may be extracted as an important message. Additionally, as shown in FIG. 6B, even when the reply message M2 is sent to the message M1 sent to the user in a group chat room, the message M1 may be extracted as an important message. In addition, as shown in FIG. 6C, in cases where the user sets a separate bookmark B for the received message M1, the received message M1 can be extracted as an important message. In other words, since the user determines the message M1 to be important and bookmarked the message, the message M1 may be extracted and utilized as the important message.

Figure 7A:
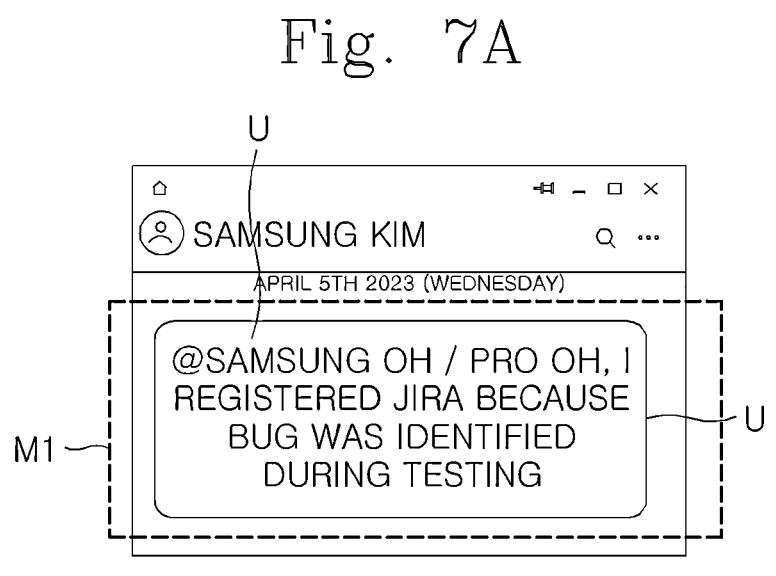

In addition, FIG. 7A shows a case where the received message M1 is sent by specifying a user U, and since the user in question needs to respond directly, the message M1 may be set as an important message. FIG. 7B shows a case where a user directly entered a comment R in a channel thread T1 provided by the messenger. Since the user can be seen as interested in the channel thread T1, the corresponding thread T1 may be set as an important message.

In this manner, when the messages with the user interaction are extracted as the important messages, the message group generation unit 110 may extract keywords from the extracted important messages and set the important messages as a reference group in operation S130. In other words, in order to determine the user's interests or importance, keywords may be extracted through morphological analysis of important messages and the frequency of each keyword may be obtained. Next, the reference group may be set to include keywords, frequencies, important messages, etc.

Next, the message group generation unit 110 may compare the keywords of the collected messages with the keywords of the reference group to obtain a first similarity of each message in operation S140. Here, the first similarity may be obtained by calculating the cosine similarity between the keywords by using the frequency of each keyword as a weight. However, the present disclosure is not limited to the cosine similarity, and anything that can obtain similarity of a document, such as Jaccard Similarity, can be utilized.

Once the first similarity is obtained, a reference score for each of the plurality of message groups may be set, the first similarity and the reference score may be compared, and the collected messages may be classified into one of the plurality of message groups in operation S150. For example, when the reference scores of the message groups are set as shown in FIG. 3A, messages with the first similarity of 0.8 or more may be classified into a first message group, messages with the first similarity of less than 0.8 and more than 0.7 may be classified as a second message group, and messages with the first similarity of less than 0.7 and more than 0.6 may be classified into a third message group. Additionally, messages with the first similarity of less than 0.6 and more than 0.5 may be classified into a fourth message group. In this manner, the message group generation unit 110 may generate each message group. Here, since the first message group includes all messages with the first similarity of 0.8 or more, the first message group may include all the important messages included in the reference group. Depending on the embodiment, it is possible to set the reference score of each message group in advance before calculating the first similarity.

When receiving a new message, the message importance determination unit 120 may determine the importance of the new message based on keywords included in the new message. Depending on the embodiment, the importance of the new message may be determined by determining the message group including the new message among the plurality of message groups classified according to the importance of the message. That is, when receiving a new message transmitted by another user terminal 1 from the messenger server M, the message importance determination unit 120 may determine which of the plurality of message groups the new message is included in, and through this, the importance of the new message may be determined.

Figure 8:
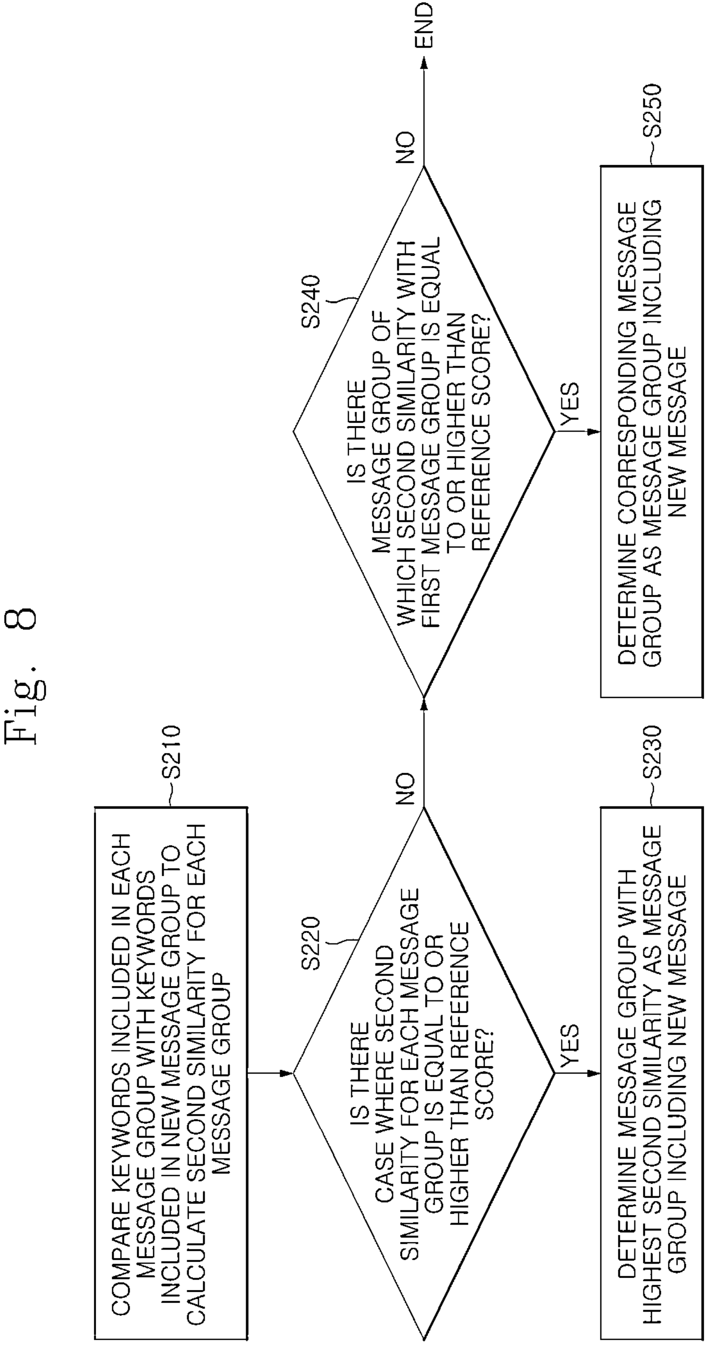
FIG. 8 is a flowchart illustrating determining of a message group of a new message according to an embodiment of the present disclosure.
Figure 10:
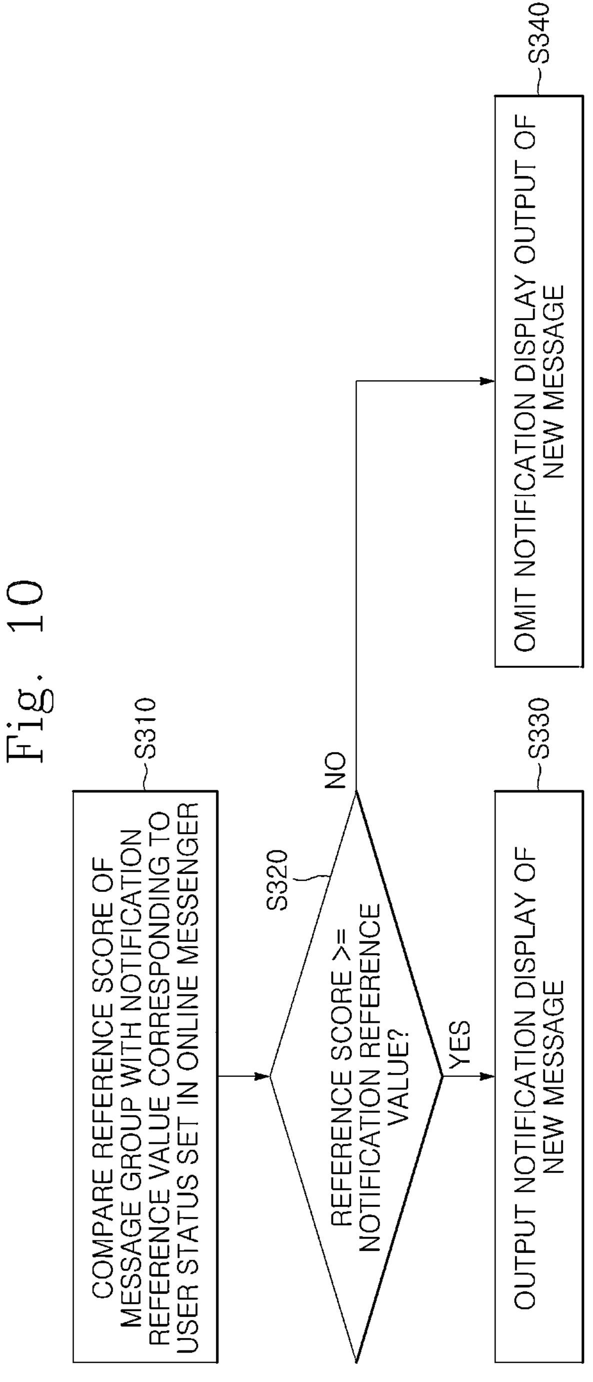
FIG. 10 is a flowchart illustrating determining of whether to output a notification display of a new message according to an embodiment of the present disclosure.

Specifically, referring to FIG. 8, the message importance determination unit 120 may compare keywords included in each message group with keywords included in the new message to obtain a second similarity for each message group in operation S210. Here, the message importance determination unit 120 may generate keywords through morphological analysis of the new message, and compare the keywords of the new message with keywords included in each message group. Here, in the same manner as in the first similarity, the second similarity may be obtained based on cosine similarity by reflecting the frequency as a weight.

Meanwhile, depending on the embodiment, when receiving the new message, the message importance determination unit 120 may first confirm whether a message group corresponding to the corresponding user has been generated. When the message group has not been generated, the importance of the new message cannot be determined, so further progress may be stopped. That is, since an error occurred in which the message group was not generated, the message importance determination unit 120 may perform a predetermined operation in order to process the error. For example, a notification display for the received new message may be terminated without being performed. Alternatively, depending on the embodiment, it is possible to set to perform the notification display for the corresponding new message and terminate the notification display.

Next, the message importance determination unit 120 may compare the second similarity for each message group with the reference score set for each message group in operation S220. Here, when one of the second similarities obtained for each message group is higher than the reference score of the corresponding message group, the new message may be considered to be included in the corresponding message group. However, depending on the embodiment, there may be cases where the second similarity for the plurality of message groups is higher than the reference score. Therefore, when there is a case where the second similarity for each message group is equal to or higher than the reference score set for each message group in operation S220, the message group with the highest second similarity among the second similarities that are equal to or higher than the reference score may be determined as the message group containing the new message in operation S230. In other words, when there is a case where the second similarities for the plurality of message groups are equal to or higher than the reference score of the corresponding message group, the message group with the highest second similarity among them may be selected and determined as the message group containing the new message.

For example, as shown in FIG. 9A, when the reference score of the first message group is 0.8, the reference score of the second message group is 0.7, and the reference score of the third message group is 0.6, there may be a case in which the second similarity of the new message with the first message group is 0.6, the second similarity with the second message group is 0.7, and the second similarity with the third message group is 0.8. Here, the second similarity of the new message group for the second message group and the third message group is each equal to or higher than the reference score. However, since the second similarity of the third message group is 0.8 and the second similarity of the second message group is 0.7, the message importance determination unit 120 may determine the third message group with the higher second similarity as the message for the new message.

Meanwhile, when there is no case where the second similarity for each message group is equal to or higher than the reference score set for each message group in operation S220, the message importance determination unit 120 may compare the second similarity with the first message group with the highest reference score among the message groups with the reference score for each message group in operation S40. Next, when there is the message group whose second similarity with the first message group is equal to or higher than the reference score in operation S240, the corresponding message group may be determined as the message group containing the new message in operation S250.

Referring to FIG. 9B, there may be cases where, when the reference score of the first message group is 0.8, the reference score of the second message group is 0.7, and the reference score of the third message group is 0.6, the second similarity with the first message group of the new message is 0.7, the second similarity with the second message group is 0.6, and the second similarity with the third message group is 0.5. In other words, there may be no case where the second similarity for each message group is equal to or higher than the reference score set for each message group. Here, since there is no case where the second similarity is the reference score, this may be treated as an error and terminated. However, the message importance determination unit 120 may compared once again the second similarity with the first message group having the highest reference score among the message groups, with the reference score for each message group.

In this case, the second similarity with the first message group is 0.7, which corresponds to the reference score of the second message group. Accordingly, the message importance determination unit 120 may determine that the new message corresponds to the second message group. That is, the first message group can be seen as corresponding to the reference group, and in this case, each message group may be classified based on the first similarity with the first message group. Accordingly, the fact that the second similarity with the first message group matches the reference score of the second message group corresponds to classifying the new message into the second message group. Therefore, when there is no case where the second similarity for each message group is equal to or higher than the reference score set for each message group, the message importance determination unit 120 may compare once again the second similarity with the first message group, with the reference score for each message group, thereby determining the message group including the new message.

On the other hand, when there is no message group whose second similarity with the first message group is equal to or higher than the reference score in operation S240, further progress may be stopped and terminated. In other words, since there is no message group containing the new message, this may be treated as an error. In this case, the notification control server 100 may set in advance whether to display a notification of the new message according to the error in order to process the error.

The notification display determination unit 130 may control a notification display indicating reception of the new message based on the importance of the new message and the user status. Depending on the embodiment, the notification display determination unit 130 may compare the reference score of the message group with a notification reference value corresponding to the user status set in the online messenger, and display the notification display according to the comparison result.

For example, when the reference score is equal to or higher than a notification reference value, the notification display indicating the reception of the new message may be output, and when the reference score is less than the notification reference value, the output of the notification display may be omitted. In other words, for new messages that are more important than the user status, a notification display may be output to notify the user of the reception of the message, and for new messages that are less important than the user status, the output of the notification display may be omitted to avoid disturbing the user.

Depending on the embodiment, even when the reference score is less than the notification reference value, instead of omitting the output of the notification display, it is possible to output the notification display with a relatively low intensity. In other words, after the intensity of the notification display is set in advance to multiple levels, the notification display may be displayed at a high intensity when the reference score is equal to or higher than the notification reference value, and the notification display may be displayed at a low intensity when the reference score is less than the notification reference value. At this time, by further considering the importance of the new message, it is possible to display the notification display at different levels depending on the importance. Here, depending on the intensity of the notification, each level may be distinguished by varying the intensity of vibration or sound that indicates the reception of the new message, or by varying the type of vibration or sound.

Here, the new message is received on the online messenger, and the notification display determination unit 130 controls the output of the notification display notifying the reception of the new message. In other words, since the notification display determination unit 130 does not block the reception of the new message, the reference score and the notification reference value may be compared, and then a control signal controlling the output of the notification display for the new message may be transmitted to the user terminal 1 according to the comparison result.

The notification display may notify the user of the reception of the new message through vibration, sound, visual display, etc., when the new message is received. In addition, the visual display may be a pop-up window or a top bar display object on the display device of the user terminal 1. In addition, depending on the embodiment, it is possible to implement a visual display using a display object that distinguishes and displays a chat room to which the new message is sent from the chat room lists within the online messenger. For example, from the chat room list, it is possible to utilize a method such as displaying the background color of the chat room where the new message is sent in a different color, or additionally displaying images, symbols, characters, dynamic objects, etc., in the chat room.

Figure 12A:
FIG. 12A is an exemplary diagram illustrating a message notification display when a new message is received while the user status is set to "meeting"
Figure 12B:
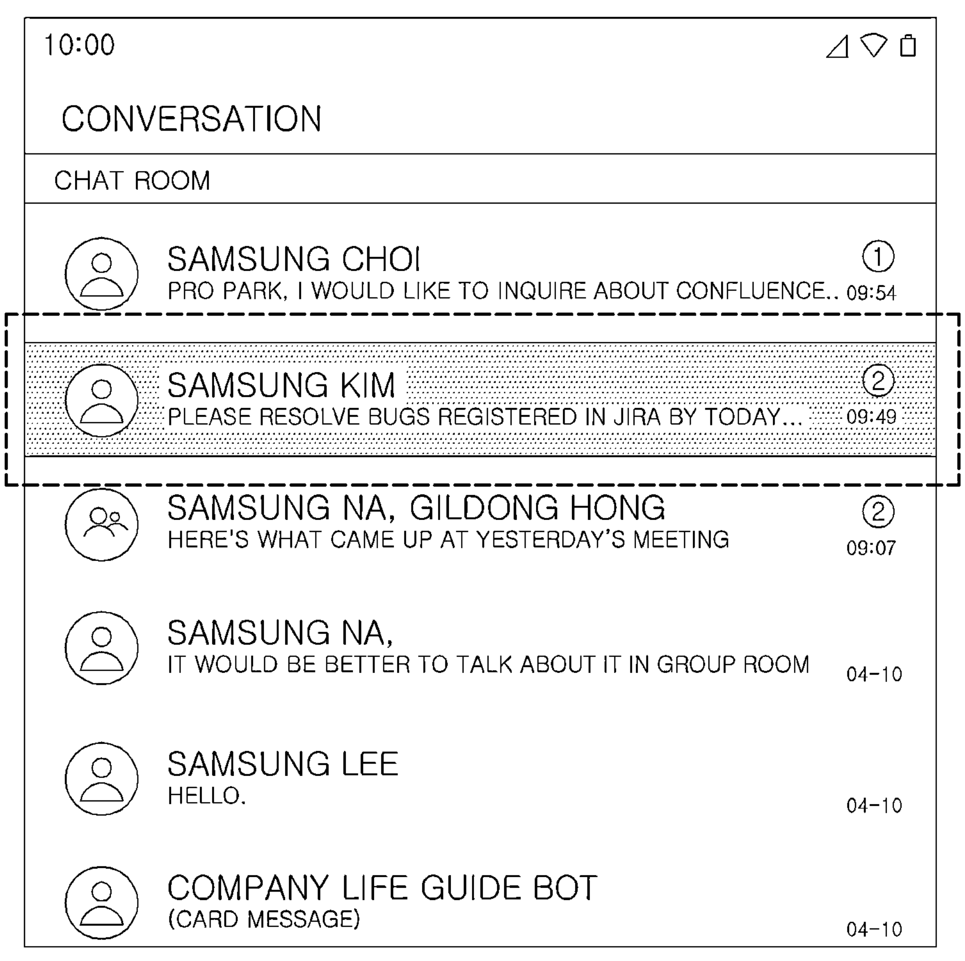
FIG. 12B is an exemplary diagram illustrating a message notification display when a user enters a chat room list on an online messenger while the user status is set to "meeting"

The reference score for each message group and the notification reference value for each user status may be set as shown in FIG. 11. At this time, FIG. 12A and FIG. 12B correspond to a case where a new message corresponding to a first message group is received when the user status is "meeting". Here, the notification reference value of "meeting" is 0.7, and the reference score of the first message group is 0.8. That is, since the reference score is equal to or higher than the notification reference value, the notification display determination unit 130 may output a notification display, and the user terminal 1 may output a notification display according to the reception of the corresponding new message. Therefore, as shown in FIG. 12A, when the user terminal 1 is a smartphone, a notification such as "[Important] 2 new messages" may be displayed on the display object of the top bar. Additionally, as shown in FIG. 12B, when a user enters a chat room list on an online messenger, a display object indicating the chat room in which the new message was received may be displayed. This corresponds to an embodiment in which the background color of the chat room is displayed in a different color.

Figure 13A:
FIG. 13A is an exemplary diagram illustrating a message notification display when a new message is received while the user status is set to "holiday"
Figure 13B:
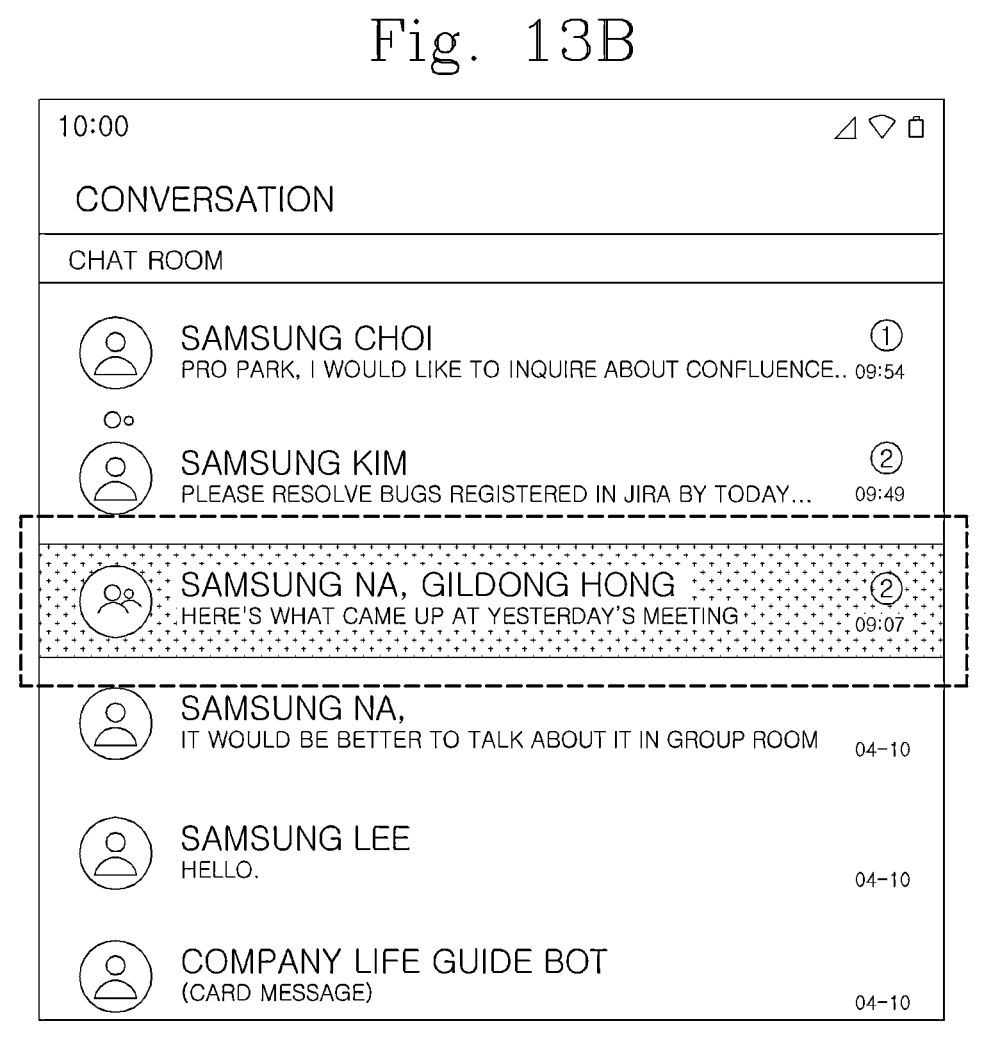

In addition, FIG. 13A and FIG. 13 B corresponds to a case in which, when the user status is "holiday", a second similarity of the new message does not reach the reference score of each message group, but the second similarity with the first message group is 0.6. Here, the new message is determined not to be included in any message group based on the second similarity, but since the second similarity with the first message group is 0.6, the new message may be determined to be included in the third message group. In this case, since the notification reference value corresponding to "holiday" is 0.6 and the reference score of the third message group is 0.6, this corresponds to a case where the reference score is equal to or higher than the notification reference value. Therefore, as shown in FIG. 13A, a notification display such as the display object "[Important] 2 new messages" may be displayed on the top bar of the user terminal 1. Additionally, as shown in FIG. 13B, when a user enters the chat room list on the online messenger, a display object that displays the background color of the chat room in which the new message was received in a different color may be displayed. However, compared to FIG. 12B, since the importance of the new message is low, the display object may be displayed with a different background color to distinguish the low importance of the new message.

Figure 14A:
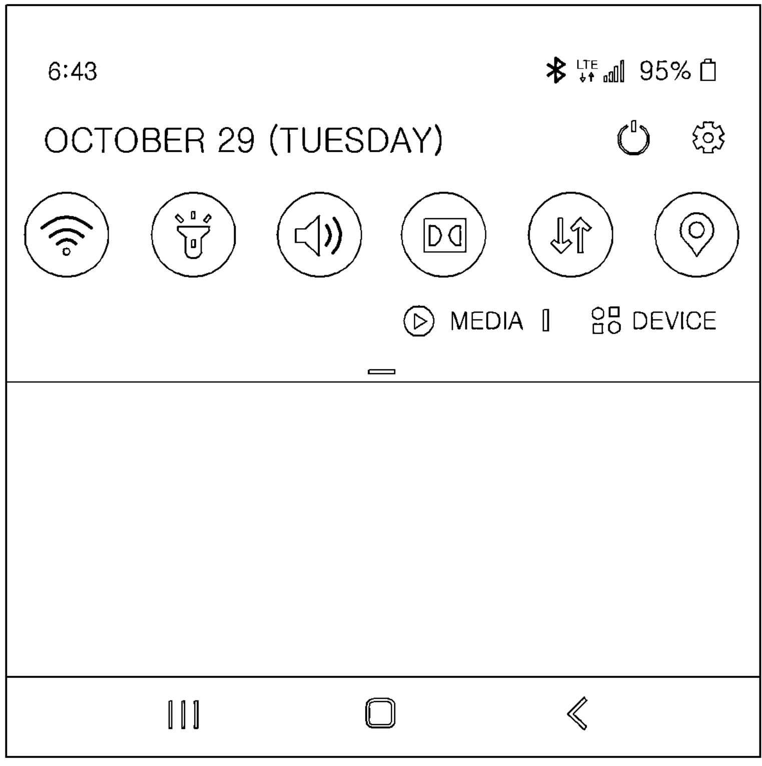
FIG. 14A is an exemplary diagram illustrating a message notification display when a new message is received while the user status is set to "vacation"
Figure 14B:
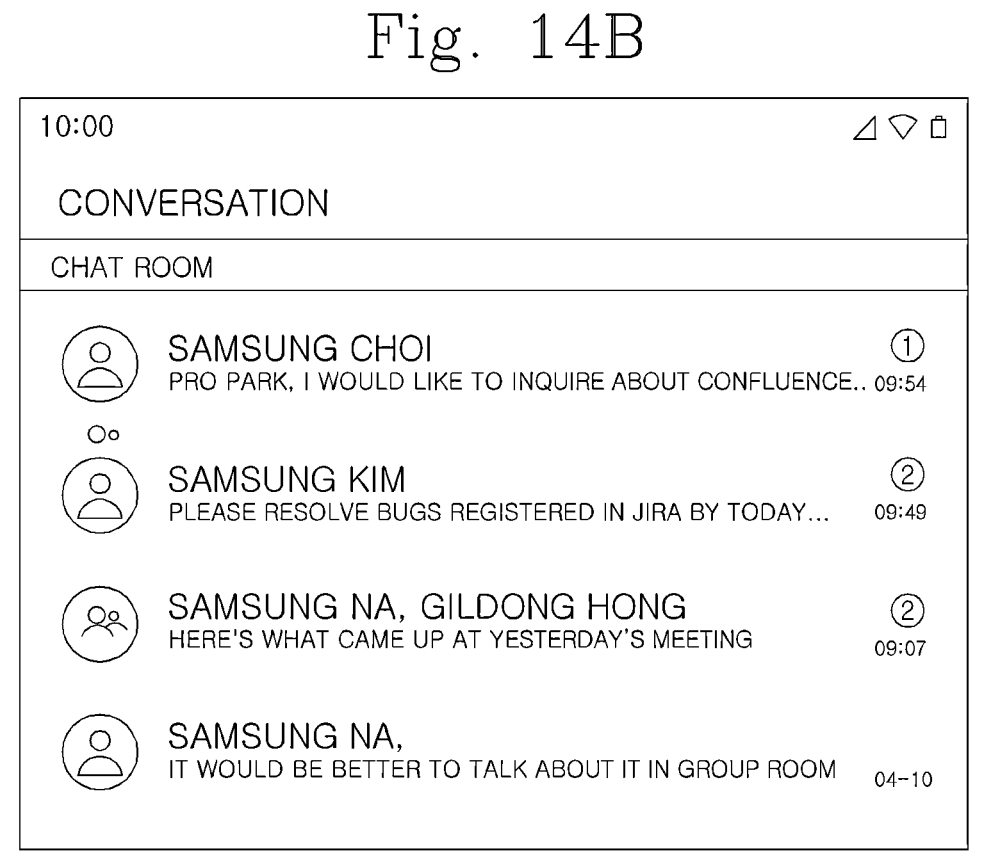

Meanwhile, FIG. 14A and FIG. 14B correspond to a case where a new message corresponding to the third message group is received when the user status is "vacation". Here, since the notification reference value of "vacation" is 0.8 and the reference score of the third message group is 0.6, this corresponds to a case where the reference score is less than the notification reference value. Therefore, as shown in FIG. 14A, display of the display object in the top bar may be omitted despite the reception of the new message. In addition, as shown in FIG. 14B, when a user enters the chat room list on the online messenger, the number of unread messages by the user may be displayed in each chat room list, but a display object indicating the chat room to which the new message was received may be omitted.

In addition, when the second similarity of the new message is less than the reference score of each message group and the second similarity with the first message group is also less than the reference score of each message group, the notification display of the new message may be omitted as shown in FIG. 14.

The update unit 140 may periodically or aperiodically update the plurality of message groups based on the messages received by the online messenger. That is, the update unit 140 may perform an operation of periodically updating each message group to reflect the user's recent interest and changes in importance.

For example, the update unit 140 may collect messages received over the past 90 days periodically (e.g., 3 months) at predetermined periods or aperiodically at the user's request, and then update the received messages. Among the received messages, the messages with user interaction may be extracted as important messages and the message group may be updated.

In addition, when the notification display for the new message is processed, the update unit 140 may update and correct keyword frequencies corresponding to the keywords included in the new message within the message group including the new message, by using the keywords of the new message.

Figure 15:
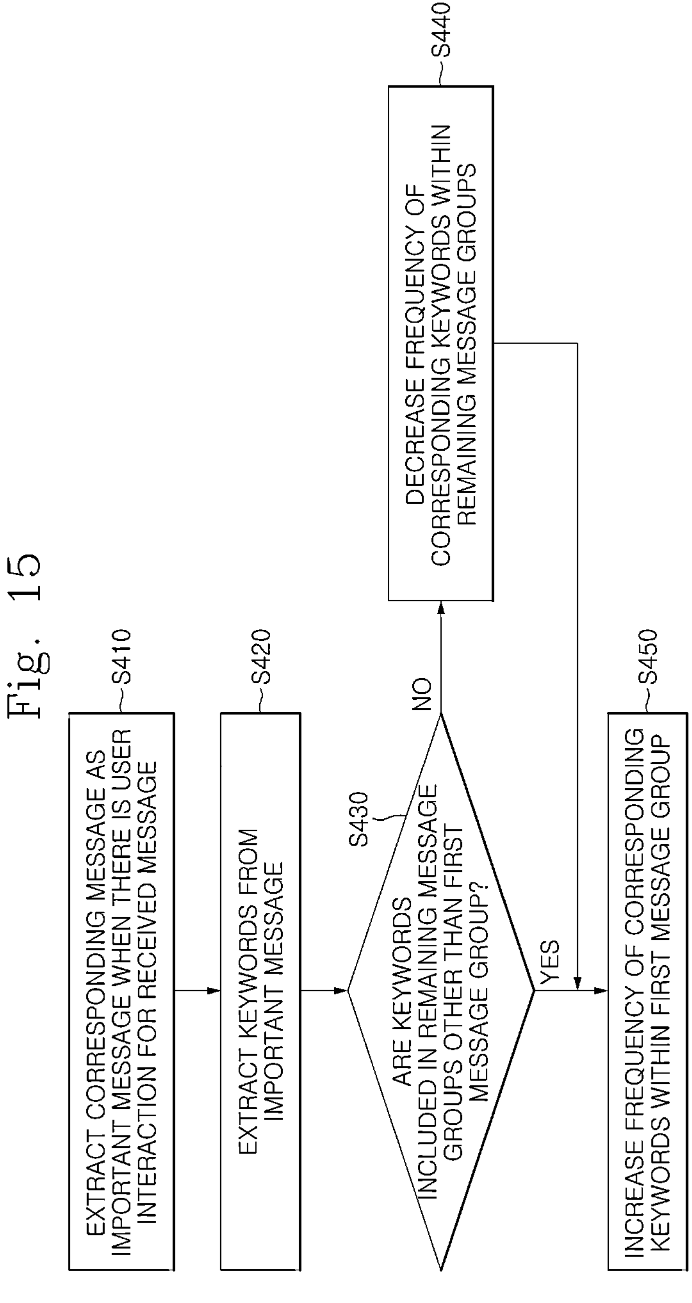
FIG. 15 is a flowchart illustrating updating of a message group according to an embodiment of the present disclosure.

In addition, referring to FIG. 15, the update unit 140 may detect, when user interact for the message received by the user is performed, the user interact and extract the corresponding message as the important message in operation S410. Next, keywords may be extracted from the important message in operation S420, and whether the important message is included in the remaining message groups other than the first message group with the highest reference score among the plurality of message groups may be confirmed in operation S430.

Here, when the important message is included in the remaining message groups in operation S430, the frequency of the keywords corresponding to the important message in the remaining message groups may be reduced in operation S440, and the frequency of the keywords corresponding to the important message in the first message group may be increased in operation S450. That is, since the corresponding message moves from the existing remaining message group to the first message group, the frequency of the corresponding keywords in the existing remaining message group may be decreased, and the frequency of the keywords of the first message group may be newly increased.

On the other hand, when the keyword is not included in the remaining message groups in operation S430, the frequency of the corresponding keywords in the first message group may be increased in operation S450. That is, since the corresponding message is newly added to the first message group, the remaining existing message groups may be maintained and only the frequency of the keywords in the first message group may be increased.

Here, it has been described that the update unit 140 directly performs an update on each of the plurality of message groups. However, depending on the embodiment, when the update unit 140 requests periodical or aperiodical update from the message group generation unit 110, the message group generation unit 110 may perform the above-described operation to perform the update.

Figure 16:
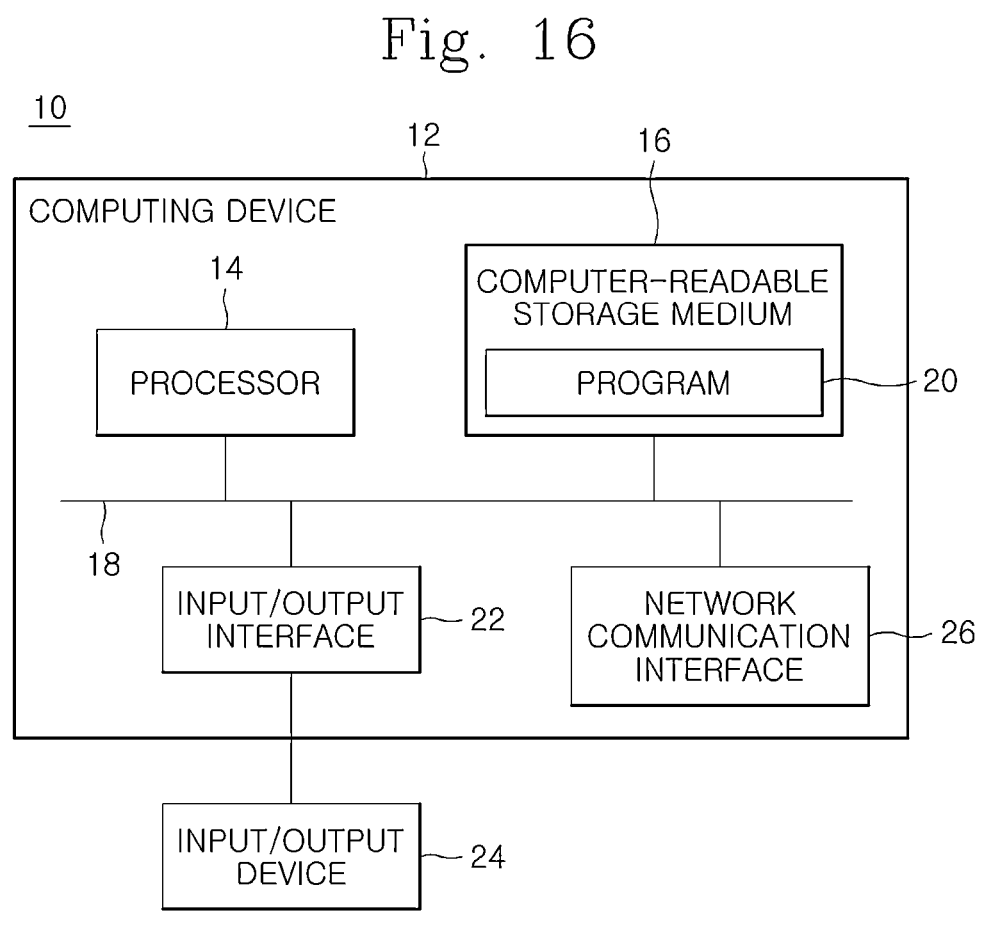

FIG. 16 is a block diagram illustrating a computing environment 10 suitable for use in exemplary embodiments. In the illustrated embodiment, each component may have a different function and capability in addition to those described below, and may include additional components in addition to those described below.

The illustrated computing environment 10 includes a computing device 12. In an embodiment, the computing device 12 may be a device (e.g., notification control server 100) that controls message notifications of an online messenger.

The computing device 12 includes at least one processor 14 a computer-readable storage medium 16, and a communication bus 18. The processor 14 may cause the computing device 12 to operate in accordance with the above-descried exemplary embodiment. For example, the processor 14 may execute one or more programs stored on the computer-readable storage medium 16. The one or more programs may include one or more computer-executable instructions, and the computer-executable instructions, when executed by the processor 14, may be configured to cause the computing device 12 to perform operations according to exemplary embodiments.

The computer-readable storage medium 16 is configured to store computer-executable instructions or program code, program data, and/or other suitable form of information. The program 20 stored in the computer-readable storage medium 16 includes a set of instructions executable by the processor 14. In an embodiment, the computer-readable storage medium 16 includes a memory (a volatile memory such as a random access memory, a non-volatile memory, or an appropriate combination thereof), one or more magnetic disk storage devices, optical disk storage devices, flash memory devices, any other type of storage medium that can be accessed by computing device 12 and store desired information, or a suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be coupled to other components of the computing device 12 through the input/output interface 22. The exemplary input/output device 24 may include a pointing device (such as a mouse or trackpad), a keyboard, a touch input device (such as a touchpad or touch screen), a voice or sound input device, various types of sensor devices, and/or an input device such as an imaging device, and/or a display device, a printer, and an output device such as a speaker and/or network card. The exemplary input/output device 24 may be included within the computing device 12 as the component constituting the computing device 12, or may be connected to the computing device 12 as a separate device distinct from the computing device 12.

Figure 17:
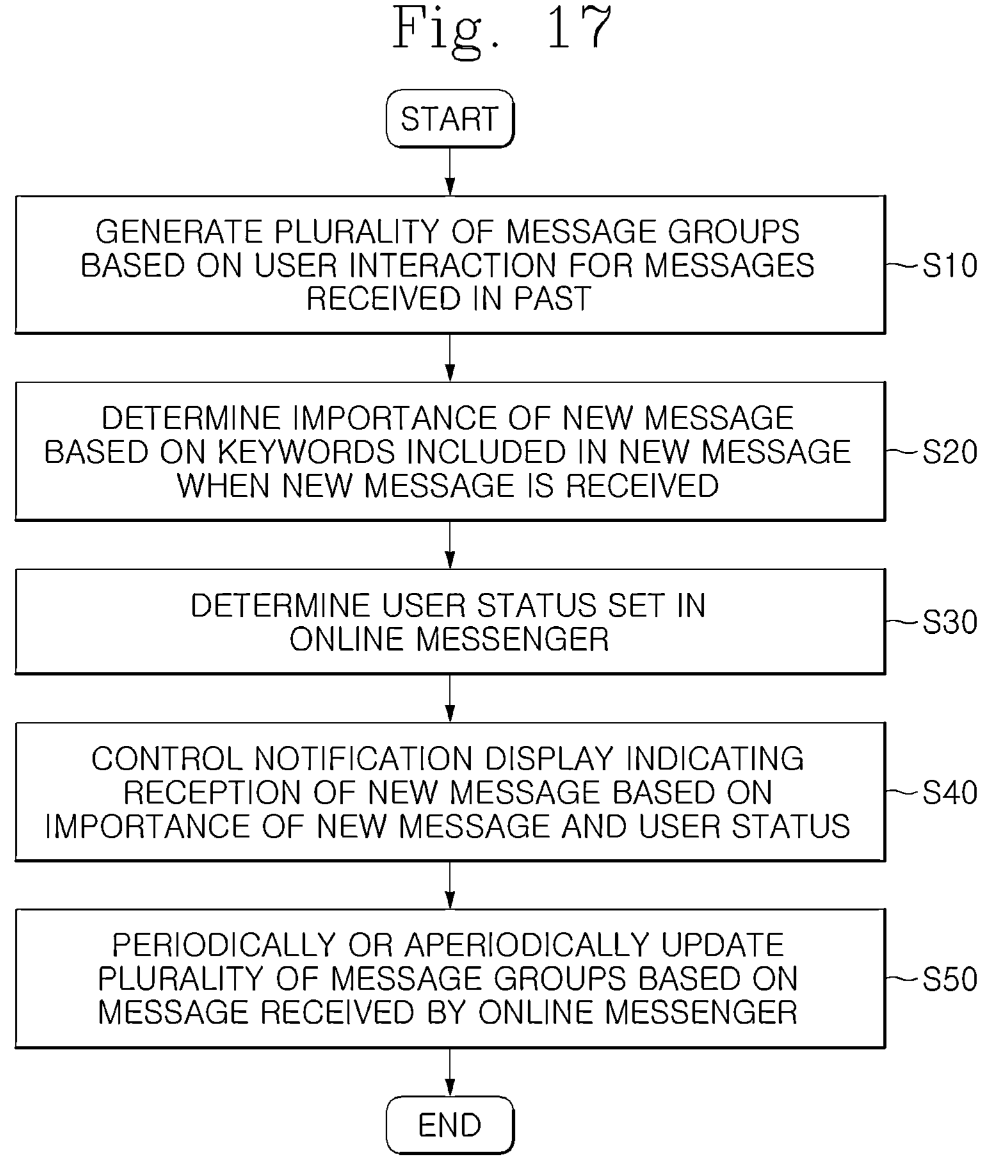
FIG. 17 is a flowchart illustrating a message notification method of an online messenger according to an embodiment of the present disclosure.

FIG. 17 is a flowchart illustrating a message notification method of an online messenger according to an embodiment of the present disclosure. Here, each operation in FIG. 17 may be performed by a notification control server, etc.

Referring to FIG. 17, the notification control server may generate a plurality of message groups based on a user interaction with messages received in the past in operation S10. In other words, the plurality of message groups may be defined in advance according to the importance of each message, and each message group may be generated for each user of the online messenger.

Specifically, the notification control server may first collect the messages received in the past to generate the plurality of message groups. In other words, the messages received through the online messenger may be collected for a predetermined period (e.g., the last 90 days).

Next, the notification control server may extract messages with user interaction from the collected messages as important messages. That is, assuming that the user will performs interaction on messages that the user is interested in or on important messages, the messages with the user interaction among the plurality of messages may be extracted as the important messages.

In addition, the notification control server may extract keywords from the extracted important messages, and set the important messages as a reference group. In other words, in order to determine the user's interests or importance, the keywords may be extracted through morphological analysis of the important messages and the frequency of each keyword may be obtained. Next, the reference group may be set to include the keywords, frequencies, important messages, etc.

The notification control server may obtain a first similarity of each of the messages by comparing the keywords of the collected messages with the keywords of the reference group. Here, the first similarity may be obtained by calculating the cosine similarity between the keywords by using the frequency of each keyword as a weight. However, the present disclosure is not limited to the cosine similarity, and anything that can obtain similarity of a document, such as Jaccard Similarity, can be utilized.

Once the first similarity is obtained, a reference score for each of the plurality of message groups may be set, the first similarity and the reference score may be compared, and the collected messages may be classified into one of the plurality of message groups.

Meanwhile, the plurality of message groups may be stored including the keywords extracted from the messages included in each message group and the frequency of each keyword. Here, the keyword corresponds to a set of words obtained by analyzing the morphemes of the messages included in the corresponding message group, and the frequency corresponds to the cumulative number of each keyword in the messages included in the corresponding message group. The plurality of generated message groups may be stored in a message group database.

Next, when a new message is received, the notification control server may determine the importance of the new message based on keywords included in the new message in operation S20. Depending on the embodiment, the importance of the new message may be determined by determining the message group containing the new message among the plurality of message groups classified according to the importance of the message. That is, when a new message sent from another user terminal is received from the messenger server, the notification control server may determine which of the plurality of message groups the new message is included in, and through this, the importance of the new message may be determined.

Specifically, the notification control server may compare keywords included in each message group with keywords included in the new message to obtain a second similarity for each message group. Here, the notification control server may generate keywords through morphological analysis of the new message, and compare the keywords of the new message with keywords included in each message group. Here, in the same manner as in the first similarity, the second similarity may be obtained based on cosine similarity by reflecting the frequency as a weight.

Depending on the embodiment, when the new message is received, the notification control server may first confirm whether a message group corresponding to the corresponding user has been generated. When the message group has not been generated, the importance of the new message cannot be determined, so further progress may be stopped and terminated. That is, since an error occurred in which the message group was not generated, a notification display for the received new message may be set in advance to be terminated without being performed.

Next, the notification control server may compare the second similarity for each message group with the reference score set for each message group. Here, when one of the second similarities obtained for each message group is higher than the reference score of the corresponding message group, the new message may be considered to be included in the corresponding message group.

However, depending on the embodiment, there may be cases where the second similarity for the plurality of message groups is higher than the reference score. Therefore, when there is a case where the second similarity for each message group is equal to or higher than the reference score set for each message group, the message group with the highest second similarity among the second similarities that are equal to or higher than the reference score may be determined as the message group containing the new message. That is, when there is a case where the second similarities for the plurality of message groups are equal to or higher than the reference score of the corresponding message group, the message group with the highest second similarity among them may be selected and determined as the message group containing the new message.

Meanwhile, when there is no case where the second similarity for each message group is equal to or higher than the reference score set for each message group, the notification control server may compare the second similarity with the first message group with the highest reference score among the message groups with the reference score for each message group. Next, when there is the message group whose second similarity with the first message group is equal to or higher than the reference score, the corresponding message group may be determined as the message group containing the new message. That is, the first message group can be seen as corresponding to the reference group, and in this case, each message group may be classified based on the first similarity with the first message group. Accordingly, the fact that the second similarity with the first message group matches the reference score of the second message group corresponds to classifying the new message into the second message group. Therefore, when there is no case where the second similarity for each message group is equal to or higher than the reference score set for each message group, the notification control server may compare once again the second similarity with the first message group, with the reference score for each message group, thereby determining the message group including the new message.

On the other hand, when there is no message group whose second similarity with the first message group is equal to or higher than the reference score, further progress may be stopped and terminated. In other words, since there is no message group containing the new message, this may be treated as an error.

Next, the notification control server may determine the user status set in the online messenger in operation S30, and control a notification display indicating the reception of the new message based on the importance of the new message and the user status in operation S40.

Depending on the embodiment, the notification control server may compare the reference score of the message group with a notification reference value corresponding to the user status set in the online messenger, and display the notification display according to the comparison result. For example, when the reference score is equal to or higher than a notification reference value, the notification display indicating the reception of the new message may be output, and when the reference score is less than the notification reference value, the output of the notification display may be omitted. In other words, for new messages that are more important than the user status, a notification display may be output to notify the user of the reception of the message, and for new messages that are less important than the user status, the output of the notification display may be omitted to avoid disturbing the user.

In addition, depending on the embodiment, even when the reference score is less than the notification reference value, instead of omitting the output of the notification display, it is possible to output the notification display with a relatively low intensity. In other words, after the intensity of the notification display is set in advance to multiple levels, the notification display may be displayed at a high intensity when the reference score is equal to or higher than the notification reference value, and the notification display may be displayed at a low intensity when the reference score is less than the notification reference value. At this time, by further considering the importance of the new message, it is possible to display the notification display at different levels depending on the importance. Here, depending on the intensity of the notification, each level may be distinguished by varying the intensity of vibration or sound that indicates the reception of the new message, or by varying the type of vibration or sound.

Here, the new message is received on the online messenger, and the notification control server controls the output of the notification display notifying the reception of the new message. In other words, since the notification control server does not block the reception of the new message, the reference score and the notification reference value may be compared, and then a control signal controlling the output of the notification display for the new message may be transmitted to the user terminal according to the comparison result.

Here, the notification display may notify the user of the reception of the new message through vibration, sound, visual display, etc., when the new message is received. In addition, the visual display may be a pop-up window or a top bar display object on the display device of the user terminal. In addition, depending on the embodiment, it is possible to implement a visual display using a display object that distinguishes and displays a chat room to which the new message is sent from the chat room lists within the online messenger. For example, it is possible to utilize a method such as displaying the background color of the chat room where the new message is sent in a different color, or additionally displaying images, symbols, characters, dynamic objects, etc., in the chat room.

In addition, the message notification method of the online messenger according to an embodiment of the present disclosure may further include periodically or aperiodically updating the plurality of message groups based on the messages received by the online messenger in operation S50. That is, the notification control server may perform an operation of periodically updating each message group to reflect the user's recent interest and changes in importance.

For example, the notification control server may collect messages received over the past 90 days periodically at predetermined periods or aperiodically at the user's request, and then extract the message with user interaction among the received messages as the important message to update the message group.

In addition, when the notification display for the new message is processed, the notification control server may update and correct keyword frequencies corresponding to the keywords included in the new message within the message group including the new message, by using the keywords of the new message.

In addition, the notification control server may detect, when user interact for the message received by the user is performed, the user interact and extract the corresponding message as the important message. Next, keywords may be extracted from the important message, and whether the important message is included in the remaining message groups other than the first message group with the highest reference score among the plurality of message groups may be confirmed.

Here, when the important message is included in the remaining message groups, the frequency of the keywords corresponding to the important message in the remaining message groups may be reduced, and the frequency of the keywords corresponding to the important message in the first message group may be increased. That is, since the corresponding message moves from the existing remaining message group to the first message group, the frequency of the corresponding keywords in the existing remaining message group may be decreased, and the frequency of the keywords of the first message group may be newly increased.

On the other hand, when the keyword is not included in the remaining message groups, the frequency of the corresponding keywords in the first message group may be increased. That is, since the corresponding message is newly added to the first message group, the remaining existing message groups may be maintained and only the frequency of the keywords in the first message group may be increased.

The above-described present disclosure can be implemented as computer-readable code on a program-recorded medium. The medium may continuously store a computer readable program, or temporarily store the computer readable program for execution or downloading. Further, the medium may be a variety of recording means or storage means in the form of a single hardware or a combination of a plurality of hardware, but is not limited to a medium directly connected to any computer system, but may be distributed on a network. Examples of the medium include a magnetic medium such as a hard disk, a floppy disk and a magnetic tape, an optical recording medium such as CD-ROM and DVD, a magneto-optical medium such as a floptical disk, ROM, RAM, flash memory, and the like such that program instructions are configured to be stored. Other examples of the medium may include a recording medium or a storage medium that is managed by an application store that distributes applications or a site, a server, etc. that supply or distribute various other software. Therefore, the above detailed description should not be construed as limiting in all respects and should be considered as illustrative. The scope of the present disclosure should be determined by reasonable interpretation of the appended claims, and all changes within the equivalent scope of the present disclosure are included in the scope of the present disclosure.

The present disclosure is not limited to the above-described embodiments and attached drawings. For those skilled in the art to which the present disclosure pertains, it will be clear that components according to the present disclosure can be replaced, modified, and changed without departing from the technical spirit of the present disclosure.

What is claimed is:

1. A message notification method of an online messenger which is performed in a computing device, the message notification method comprising:

generating a plurality of message groups based on a user interaction for messages received in the past;

determining, when a new message is received, the importance of the new message based on keywords included in the new message;

identifying a user status configured within the online messenger; and controlling a notification display indicating reception of the new message based on the importance of the new message and the user status, wherein the determining of the importance of the new message comprises identifying a message group comprising the new message among the plurality of message groups classified by comparing the keywords of the new message with keywords associated with each of the plurality of message groups, wherein each of the plurality of message groups corresponds to a predetermined importance level, wherein the generating of the message groups comprises:

collecting messages received through the online messenger for a predetermined period;

extracting the message with the user interaction as the important message among the collected messages;

extracting keywords from the important message and configuring the important messages as a reference group;

comparing the keywords of the collected messages with keywords of the reference group to obtain a first similarity of each of the messages; and configuring a reference score for each of the plurality of message groups, comparing the first similarity with the reference score, and classifying the collected messages into one of the plurality of message groups.

2. The message notification method of claim 1, wherein the notification display indicates the reception of the new message by using at least one of vibration, sound, and visual display upon the reception of the new message.

3. The message notification method of claim 2, wherein the visual display displays at least one of a pop-up window, a top bar display object, and a display object that distinguishes and displays a chat room to which the new message is transmitted from a chat room list in the online messenger on a display device of a user terminal.

4. The message notification method of claim 1, wherein the controlling of the notification display comprises comparing a reference score of the message group with a notification reference value corresponding to the user status, outputting the notification display when the reference score is equal to or higher than the notification reference value, and omitting the output of the notification display when the reference score is less than the notification reference value.

5. The message notification method of claim 1, wherein the plurality of message groups further comprise and store keywords extracted from messages included in each message group and frequencies of the keywords.

6. The message notification method of claim 1, wherein the determining of the importance of the new message further comprises:

comparing the keywords included in each message group and the keywords included in the new message to obtain a second similarity for each message group;

comparing the second similarity for each message group with the reference score configured for each message group; and determining, when there is a case where the second similarity for each message group is equal to or higher than the reference score configured for each message group, the message group with the highest second similarity among the second similarities that are equal to or higher than the reference score as the message group comprising the new message.

7. The message notification method of claim 6, wherein the determining of the importance of the new message further comprises:

comparing, when there is no case where the second similarity for each message group is equal to or higher than the reference score configured for each message group, the second similarity with a first message group that has the highest reference score among the message groups with the reference score for each message group; and determining, when there is the message group whose second similarity with the first message group is equal to or higher than the reference score, the message group as the message group comprising the new message.

8. The message notification method of claim 7, further comprising:

modifying a frequency of keywords within the message group comprising the new message by using keywords of the new message.

9. The message notification method of claim 1, further comprising:

periodically or aperiodically updating the plurality of message groups based on the message received by the online messenger.

10. The message notification method of claim 9, wherein the updating comprises:

extracting, when there is a user interaction for the received message, the message as the important message;

extracting keywords from the important message, and confirming whether the important message is included in the remaining message groups other than the first message group having the highest reference score among the message groups;

decreasing the frequency of keywords corresponding to the important message within the remaining message groups and increasing the frequency of the keywords corresponding to the important message within the first message group, when the important message is included in the remaining message groups; and increasing the frequency of the keywords corresponding to the important message within the first message group when the important message is not included in the remaining message groups.

11. A computer program stored in a medium in order to perform the message notification method of an online messenger of claim 1 in combination with hardware.

12. A computing device which comprises a processor and performs message notification of an online messenger, wherein the processor is configured to:

generate a plurality of message groups based on a user interaction for messages received in the past;

determine, when a new message is received, the importance of the new message based on keywords included in the new message;

identify a user status configured within the online messenger; and control a notification display indicating reception of the new message based on the importance of the new message and the user status, wherein, for the determining of the importance of the new message, the processor is configured to identify a message group comprising the new message among a the plurality of message groups classified by comparing the keywords of the new message with keywords associated with each of the plurality of message groups, wherein each of the plurality of message groups corresponds to a predetermined importance level, and wherein, for the generating of the message groups, the processor is configured to:

collect messages received through the online messenger for a predetermined period;

extract the message with the user interaction as the important message among the collected messages;

extract keywords from the important message and configuring the important messages as a reference group;

compare the keywords of the collected messages with keywords of the reference group to obtain a first similarity of each of the messages; and configure a reference score for each of the plurality of message groups, compare the first similarity with the reference score, and classify the collected messages into one of the plurality of message groups.

13. The computing device of claim 12, wherein the controlling of the notification display comprises comparing a reference score of the message group with a notification reference value corresponding to the user status, outputting the notification display when the reference score is equal to or higher than the notification reference value, and omitting the output of the notification display when the reference score is less than the notification reference value.

14. The computing device of claim 12, wherein the determining of the importance of the new message further comprises:

comparing the keywords included in each message group and the keywords included in the new message to obtain a second similarity for each message group;

comparing the second similarity for each message group with the reference score configured for each message group; and determining, when there is a case where the second similarity for each message group is equal to or higher than the reference score configured for each message group, the message group with the highest second similarity among the second similarities that are equal to or higher than the reference score as the message group comprising the new message.

* * * * *